(12) United States Patent
Shih et al.

(10) Patent No.: US 12,032,767 B2
(45) Date of Patent: Jul. 9, 2024

(54) PANEL DEVICES

(71) Applicant: NOVATEK Microelectronics Corp., Hsin-Chu (TW)

(72) Inventors: Wei-Lun Shih, Hsinchu (TW); Ting-Hsuan Hung, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/199,970

(22) Filed: May 21, 2023

(65) Prior Publication Data

US 2023/0376136 A1    Nov. 23, 2023

(30) Foreign Application Priority Data

May 23, 2022    (TW) .................................. 111119048

(51) Int. Cl.
*G06F 3/041*      (2006.01)
*G06F 3/042*      (2006.01)
*G06F 3/14*       (2006.01)

(52) U.S. Cl.
CPC .......... *G06F 3/0412* (2013.01); *G06F 3/0421* (2013.01); *G06F 3/1407* (2013.01); *G06F 2203/04106* (2013.01)

(58) Field of Classification Search
None
See application file for complete search history.

(56) References Cited

U.S. PATENT DOCUMENTS

| | | | |
|---|---|---|---|
| 2013/0106813 A1* | 5/2013 | Hotelling | G06F 1/1626 345/207 |
| 2016/0050378 A1* | 2/2016 | Wu | H04N 25/42 348/300 |
| 2016/0307542 A1 | 10/2016 | Zheng | |
| 2020/0105183 A1 | 4/2020 | Dodson | |
| 2022/0165202 A1* | 5/2022 | Chen | G09G 3/2092 |
| 2023/0162695 A1* | 5/2023 | Chau | G02F 1/172 345/207 |

FOREIGN PATENT DOCUMENTS

| | | |
|---|---|---|
| CN | 107426428 A | 12/2017 |
| CN | 109119044 A | 1/2019 |
| CN | 110545338 A | 12/2019 |
| CN | 111947775 A | 11/2020 |
| CN | 113542499 A | 10/2021 |
| TW | 201346867 A | 11/2013 |
| TW | 201434018 A | 9/2014 |
| TW | 201926004 A | 7/2019 |
| TW | 202134942 A | 9/2021 |

* cited by examiner

*Primary Examiner* — Matthew Yeung
(74) *Attorney, Agent, or Firm* — Winston Hsu

(57) ABSTRACT

A panel device includes a touch sensor, a first light sensor and a second light sensor, a first trace, a second trace and a control circuit. The touch sensor is disposed in a first area of the panel device to generate a touch sensing signal. The first light sensor and the second light sensor are disposed in a second area of the panel device to sense ambient light and generate a first light sensing signal and a second light sensing signal. The first trace is coupled to the first light sensor. The second trace is coupled to the second light sensor. The control circuit connects the first trace and the second trace and receives the first light sensing signal and the second light sensing signal at the same time to determine an ambient brightness. Sensitivities of the first light sensor and the second light sensor are different.

30 Claims, 11 Drawing Sheets

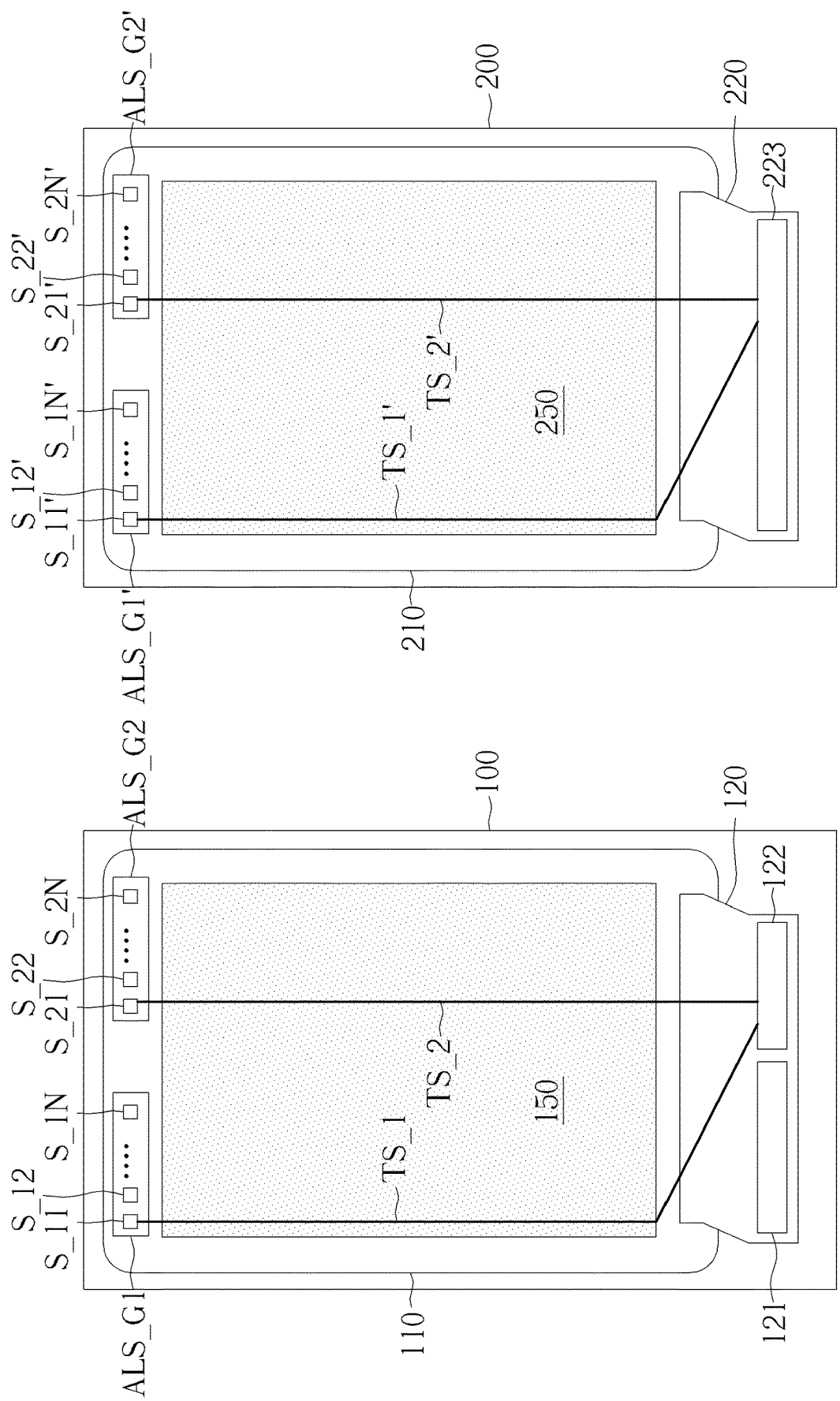

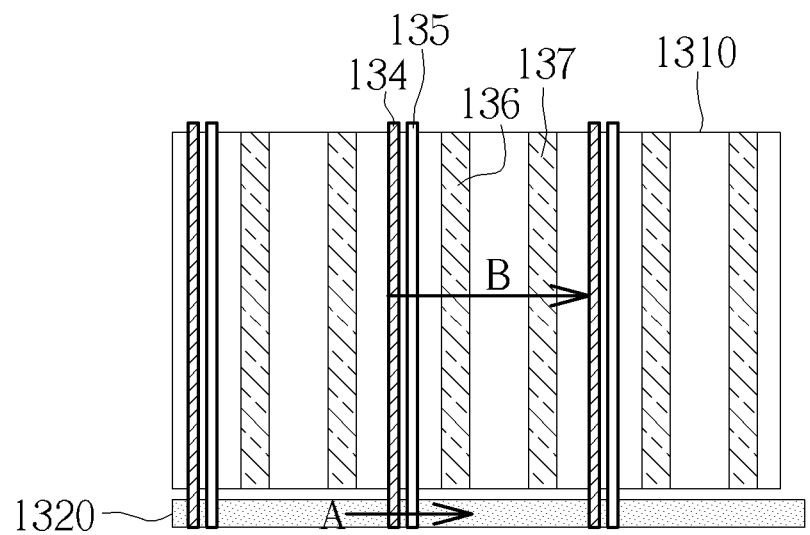
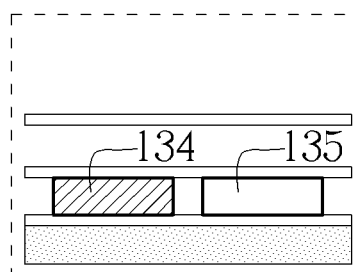 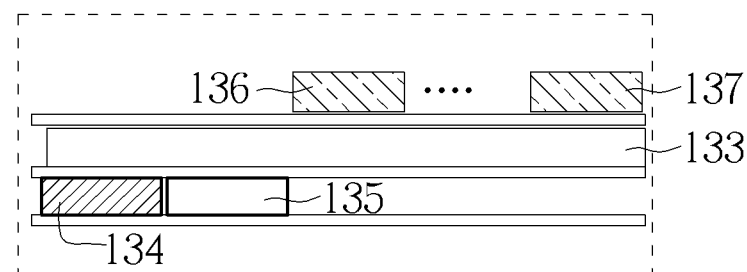
FIG. 13

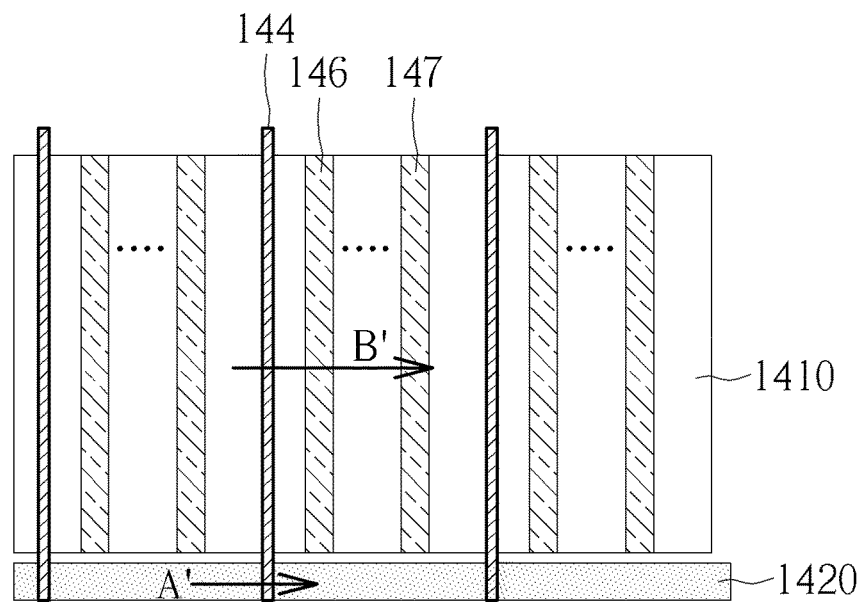
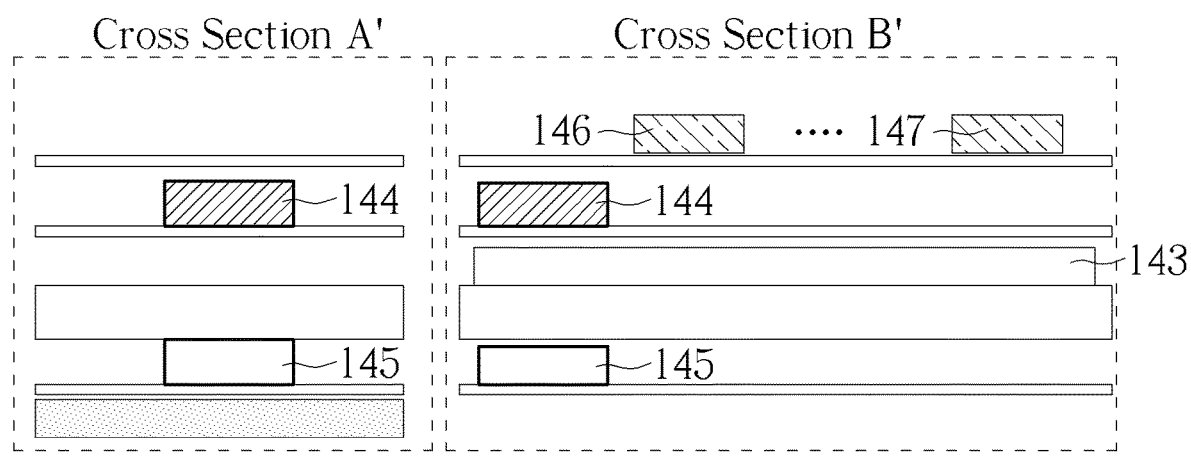
FIG. 14

PANEL DEVICES

BACKGROUND OF THE INVENTION

1. Field of the Invention

The invention relates to a panel device, more particular to a panel device that is capable of effectively detecting ambient brightness without increasing frame size.

2. Description of the Prior Art

With the rapid development of technology, portable electronic devices have the advantages of light weight, thin thickness and low power consumption, and are widely used in many consumer electronic products, such as smart phones, Tablet PC or laptop PC, etc. In order to provide users with a more comfortable visual experience, the requirements on the size of display area of electronic devices are getting higher in the current market. Therefore, how to effectively control the size of the frame to increase the size of the display area is an important issue when designing the panel device.

SUMMARY OF THE INVENTION

According to an embodiment of the invention, a panel device comprises a touch sensor, a first light sensor and a second light sensor, a first trace, a second trace and a control circuit. The touch sensor is disposed in a first area of the panel device and to generate a touch sensing signal. The first light sensor and the second light sensor are disposed in a second area of the panel device, to respectively sense ambient light and accordingly generate a first light sensing signal and a second light sensing signal. The first trace is coupled to the first light sensor. The second trace is coupled to the second light sensor. The control circuit is connected to the first trace and the second trace to receive the first light sensing signal and the second light sensing signal at the same time and determine an ambient brightness. A sensitivity of the first light sensor and a sensitivity of the second light sensor are different.

According to another embodiment of the invention, a panel device comprises a first light sensor and a second light sensor, a first trace, a second trace and a control circuit. The first light sensor and the second light sensor respectively sense ambient light and accordingly generate a first light sensing signal and a second light sensing signal. The first trace is coupled to the first light sensor. The second trace is coupled to the second light sensor. The control circuit is connected to the first trace and the second trace to receive the first light sensing signal and the second light sensing signal at the same time and determine an ambient brightness. The panel device have a display area and a non-display area, the first light sensor and the second light sensor are disposed in the non-display area of the panel device, and the first trace and the second trace extend from the control circuit along a vertical direction of the display area and through the display area, and respectively extend to the first light sensor and the second light sensor.

According to another embodiment of the invention, a panel device comprises a display area, a non-display area, a first light sensor and a second light sensor, a first trace, a second trace and a control circuit. The first light sensor and a second light sensor are disposed in the non-display area and to respectively sense ambient light and accordingly generate a first light sensing signal and a second light sensing signal. The first trace is laid out along a first direction and through the display area, and to extend to the first light sensor. The second trace is laid out along the first direction and through the display area, and to extend to the second light sensor. The control circuit is connected to the first trace and the second trace to receive the first light sensing signal and the second light sensing signal at the same time and control a brightness or a color temperature of the display area.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a schematic diagram of a panel device according to an embodiment of the invention.

FIG. 2 is a schematic diagram of a panel device according to another embodiment of the invention.

FIG. 13 is a schematic diagram of a panel device according to an embodiment of the invention.

FIG. 14 is a schematic diagram of a panel device according to another embodiment of the invention.

DETAILED DESCRIPTION

Figure 3:
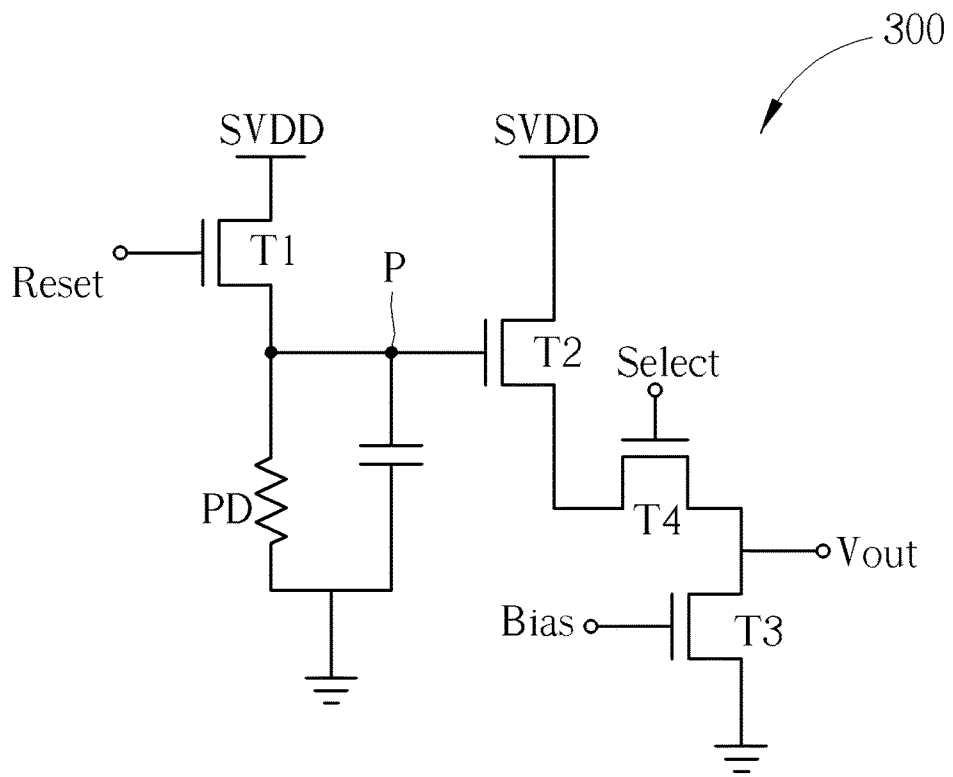
FIG. 3 shows an exemplary circuit diagram of a light sensor according to an embodiment of the invention.

Nowadays, the electronic devices are mostly provided with the capabilities of displaying, touch sensing and controlling, proximity sensing and ambient light sensing. Generally, the proximity sensor, the ambient light sensor and a portion of related circuits are disposed in the frame area of the electronic device. However, since the size of the frame area occupied by the related circuits increases as the number of sensors increases, the adjustment of the number of sensors will be limited by the size of the frame area, and it is also difficult to reduce the size of the frame area under such a design. To improve the drawback, in the following embodiments, a novel design of the sensors equipped in a panel device, as well as the design of its corresponding control circuit and wirings, is proposed. Compared with the conventional design, the proposed panel device detects ambient brightness more effectively. In addition, compared with the conventional design, the time required by the proposed panel device for detecting the ambient brightness is greatly shortened and the accuracy of ambient brightness detection is greatly improved. The proposed panel device is a panel device that is capable of effectively detecting ambient brightness without increasing the size of the frame, so as to effectively control the size of the frame, and even further reduce the size of the frame as compared to the conventional design.

FIG. 1 is a schematic diagram of a panel device according to an embodiment of the invention. The panel device 100 may be a panel device disposed in an electronic device or a portable electronic device. The panel device 100 may comprise a display panel 110 and a circuit board 120. The display panel 110 may comprise a display area 150 and a non-display area, wherein the display area 150 is also called the active area, which is the region where the screen of the panel device effectively displays images, and the non-display area refers to the region of the panel device that does not display images. The circuit board 120 may be a flexible printed circuit board.

The circuit board 120 may comprise control circuits 121 and 122 configured thereon. According to an embodiment of the invention, the display panel 110 may be a touch-controlled panel, and the control circuit 121 may be a circuit for controlling the operations of displaying and touch-sensing of the display panel 110. The control circuit 121 may further control the displaying of the display panel 110 according to the result of the touch-sensing. In addition, according to an embodiment of the invention, the control circuit 121 may further determine whether an object is in close contact with the display panel 110 according to the touch-sensing result, so as to implement the proximity sensing function. The control circuit 122 may be a circuit for controlling the operations of ambient light sensing, and may further control the displaying of the display panel 110 according to the result of the ambient light sensing. For example, the control circuit 122 may provide the result of ambient light sensing to the control circuit 121, for the control circuit 121 to accordingly adjust the brightness of the display panel 110, or accordingly adjust the color temperature of the screen, etc.

In an embodiment of the invention, the control circuit 121 may be an integrated chip, such as a Touch with Display Driver Integration (TDDI) chip, and the control circuit 122 may also be a chip, such as an Ambient Light Sensor (ALS) driving chip. It is to be noted that in some embodiments of the invention, the control circuits 121 and 122 may also be, as a whole, regarded as one control circuit.

According to an embodiment of the invention, the panel device 100 may further comprise a plurality of light sensors or a plurality of groups of light sensor, for example, the first group of light sensor ALS-G1 and the second group of light sensor ALS-G2 as shown in FIG. 1. It is to be noted that, in the embodiments of the invention, a group of light sensor may be composed of one or more light sensors. Therefore, a group of light sensor in the embodiments of the invention is not limited to comprise more than one light sensor.

In the embodiment as shown in FIG. 1, the first group of light sensor ALS-G1 may comprise light sensors $S\_11$, $S\_12$ ... $S\_1N$, and the second group of light sensor ALS-G2 may comprise light sensors $S\_21$, $S\_22$ ... $S\_2N$, wherein N is a positive integer. The first group of light sensor ALS-G1 and the second group of light sensor ALS-G2 may be disposed or installed on the non-display area of the panel device 100, for example, the area above the display area 150.

According to an embodiment of the invention, the panel device 100 may further comprise a plurality of traces, and each trace may be coupled between the control circuit 122 and one light sensor. For example, in FIG. 1, the trace $TS\_1$ is coupled between the control circuit 122 and the light sensor $S\_11$, and the trace $TS\_2$ is coupled between the control circuit 122 and the light sensor $S\_21$. It should be noted that, to simply the drawing and the description, only two traces $TS\_1$ and $TS\_2$ are shown in FIG. 1. In an actual configuration, the number of traces may be greater than or equal to the total number of light sensors, and may also be smaller than or close to the total number of light sensors.

According to an embodiment of the invention, the control circuit 122 may be directly connected to the aforementioned trace(s) which is/are coupled to the light sensor(s), or connected to the aforementioned trace(s) which is/are coupled to the light sensor(s) through one or more switch circuits or analog front-end circuits (which will be described in more detailed in the following paragraphs). The control circuit 122 may receive the light sensing signals generated by the plurality of light sensors or the plurality of groups of light sensors at the same time through the corresponding traces, to determine the ambient brightness. For example, the light sensors $S\_11$ and $S\_21$ disposed on the non-display area of the panel device 100 may be utilized to sense the ambient light and to respectively generate a first light sensing signal and a second light sensing signal, and the control circuit 122 may receive the first light sensing signal and the second light sensing signal at the same time through the corresponding traces to determine the ambient brightness, where in an embodiment of the invention, a sensitivity of the light sensor $S\_11$ and a sensitivity of the light sensor $S\_12$ are different. With such special design, the time required for detecting the ambient brightness is greatly shortened in the proposed panel device and the accuracy of detecting the ambient brightness is greatly improved as well (which will be described in more detailed in the following paragraphs).

It is to be noted that in an embodiment of the invention, the traces for coupling the light sensors may extend from the control circuit 122 along a vertical direction of the display area 150 and through the display area 150, and respectively extend to the corresponding light sensors. In other words, in the embodiments of the invention, a portion of the layout of the traces for coupling the light sensors overlaps the display area 150 of the display panel 110. Therefore, in the embodiment of the invention, the traces for coupling the light sensors (or the most parts of the traces) are not circled or laid around the frame area of the display panel 110, but are laid out in the display area 150 of the display panel 110, thereby effectively reducing the size of the frame (which will be discussed in more detailed in the following paragraphs).

According to an embodiment of the invention, the control circuit 121 and the control circuit 122 may be mounted on the circuit board 120 by Chip On Film (COF) packaging. However, the invention is not limited to the COF packaging. For example, the control circuit 121 and the control circuit 122 may also be mounted on the circuit board 120 by Chip On Glass (COG) packaging.

FIG. 2 is a schematic diagram of a panel device according to another embodiment of the invention. The panel device 200 may be a panel device disposed in an electronic device or a portable electronic device. The panel device 200 may comprise a display panel 210 and a circuit board 220. The display panel 210 may comprise a display area 250 and a non-display area, and the circuit board 220 may be a flexible printed circuit board.

In the embodiment shown in FIG. 2, the panel device 200 may further comprise a plurality of light sensors or a plurality of groups of light sensor, for example, the first group of light sensor ALS-G1' and the second group of light sensor ALS-G2', where the first group of light sensor ALS-G1' may comprise light sensors S_11', S_12' ... S_1N', and the second group of light sensor ALS-G2' may comprise light sensors S_21', S_22' ... S_2N'.

The embodiment shown in FIG. 2 is similar to FIG. 1, and the difference is in that the control circuit 223, which is an integrated control circuit, is disposed on the circuit board 220. Therefore, regarding the common descriptions of the display panel 210, the circuit board 220, the display area 250 and the light sensors, reference may be made to relevant paragraphs of FIG. 1, and are omitted here for brevity.

In the embodiment shown in FIG. 2, the control circuit 223 may be a highly integrated chip, for example, a chip that integrates the aforementioned TDDI circuit/chip and ALS driving circuit/chip, for controlling the operations of displaying and touch-sensing of the display panel 210 as well as controlling the displaying of the display panel 210 according to the result of touch-sensing, and also for controlling the operations of ambient light sensing as well as controlling the displaying of the display panel 210 according to the result of the ambient light sensing. For example, the control circuit 223 may correspondingly adjust the brightness of the display panel 210 or adjust the color temperature of the screen according to the result of ambient light sensing. In addition, according to an embodiment of the invention, the control circuit 223 may further determine whether an object is in close contact with the display panel 210 according to the touch sensing result, so as to implement the proximity sensing function.

In the embodiment shown in FIG. 2, the control circuit 223 may be directly connected to the traces that are coupled to the light sensors, such as the traces TS_1' and TS_2' in FIG. 2, or connected to the traces that are coupled to the light sensors through switch circuit(s) or analog front-end circuit(s). The control circuit 223 may receive the light sensing signals generated by the plurality of light sensors simultaneously or at the same time through the corresponding traces, so as to determine the ambient brightness. For example, the light sensors S_11' and S_21' disposed in the non-display area of the panel device 200 may be utilized to sense ambient light to generate a first light sensing signal and a second light sensing signal, respectively, and the control circuit 223 may simultaneously receive the first light sensing signal and the second light sensing signal through the corresponding traces to determine the ambient brightness. In one embodiment of the invention, the sensitivity of the light sensor S_11' and the sensitivity of the light sensor S_21' are different. In addition, in an embodiment of the invention, the traces for coupling the light sensors may extend from the control circuit 223 along a vertical direction of the display area 250 and through the display area 250, and respectively extend to the corresponding light sensors. Therefore, in the embodiments of the invention, the traces for coupling the light sensors (or most parts of the traces) are not circled or laid around the frame area of the display panel 210, but are laid out in the display area 250 of the display panel 210, and a portion of the layout of the traces for coupling the light sensors overlaps the display area 250 of the display panel 210, thereby effectively reducing the size of the frame (which will be discussed in more detailed in the following paragraphs).

It is to be noted that, in order to simplify the content of drawings, FIG. 1 and FIG. 2 present simplified diagrams in which only the components relevant to the invention are shown. As will be readily appreciated by a person of ordinary skill in the art, a panel device or a touch-controlled panel may further comprise other components not shown in FIG. 1 and/or FIG. 2.

Figure 4:
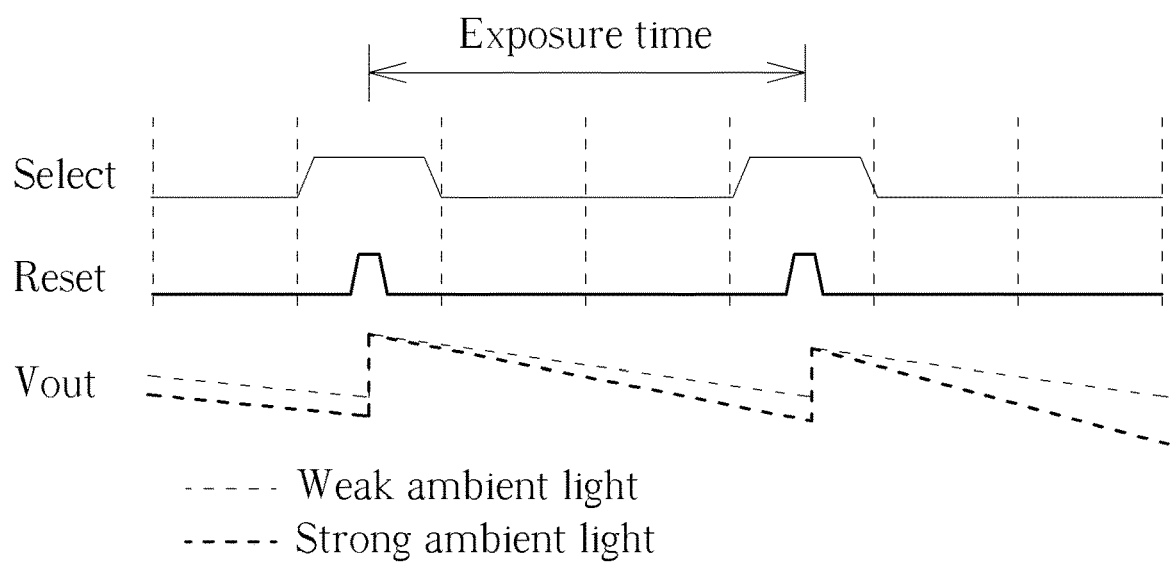
FIG. 4 is a diagram showing corresponding signal waveforms obtained when the light sensor is performing light sensing operation.

FIG. 3 shows an exemplary circuit diagram of a light sensor according to an embodiment of the invention. FIG. 4 is a diagram showing corresponding signal waveforms obtained when a light sensor is performing light sensing operation, for illustrating the light sensing operation performed by the light sensor in one exposure time. The light sensor 300 may comprise components such as transistors T1, T2, T3, T4, photodiodes PD (illustrated by equivalent resistors in FIG. 3), and capacitors. The voltage level of the selection signal Select is pulled high before the exposure time starts, so as to turn on the transistor T4. Then the voltage level of the reset signal Reset is pulled high to turn on the transistor T1, so that the voltage at the P terminal is reset to the voltage level of the voltage source SVDD, for example, 5V. Then, the voltage level of the reset signal Reset is pulled low to turn off the transistor T1, so that the voltage across the two terminals of the photodiode PD is set to 5V, and light sensing starts. When the ambient light hits the photodiode PD, discharging occurs through the photodiode PD, and the value of equivalent resistance of the photodiode PD varies with the intensity of the ambient light. The stronger the ambient light, the smaller the resistance of the photodiode, and the faster the discharge of the resistor and capacitor, so that the voltage at the P terminal will drop to a lower level. The voltage at the P terminal is provided to the output terminal as the output voltage Vout through the transistors T2 and T4, and the transistor T3 is controlled by the bias voltage Bias. For example, as shown in FIG. 4, the stronger the ambient light, the faster the output voltage Vout drops (i.e., the greater the slope of falling).

At the end of the exposure time, the voltage level of the selection signal Select is pulled high again to turn on the transistor T4, so that the voltage at the P terminal is transmitted to the output terminal, and now the output voltage Vout is received by the analog front-end circuit in the control circuit, such as the aforementioned control circuits 122, 223, etc., as the first output voltage Vout1.

Then, the voltage level of the reset signal Reset is pulled high again, and the voltage at the P terminal is reset to the voltage level of the voltage source SVDD, and at this time, the voltage at the P terminal is transmitted to the output terminal and received by the analog front-end circuit in the control circuit as the second output voltage Vout2. The control circuit obtains the ambient light sensing result according to the difference between the first output voltage Vout1 and the second output voltage Vout2.

To be more specific, the difference between the first output voltage Vout1 and the second output voltage Vout2 is converted into a value by an analog-to-digital converter (ADC) (not shown) in the analog front-end circuit, and the processor (not shown) in the control circuit, such as the aforementioned control circuits 122, 223, etc., may further determine the ambient brightness according to this value.

However, depending on the sensing capability (e.g., the sensitivity) of the photosensitive element (for example, the photodiode PD shown in FIG. 3) in the light sensor, the range of sensible or detectable ambient brightness is defined by a saturation upper limit and a saturation lower limit. If a difference between a first output voltage Vout1 and a second output voltage Vout2 equals to the saturation upper limit, it means that the currently used exposure time may be too long, and the exposure time needs to be reduced to accurately sense the ambient brightness. On the contrary, if the difference between the first output voltage Vout1 and the second output voltage Vout2 equals to the saturation lower limit, it means that the currently used exposure time may be insufficient, and the exposure time needs to be increased to accurately sense the ambient brightness.

Since the setting of the exposure time affects the sensing result, the existing panel devices have to perform multiple times of ambient light sensing, and accordingly adjust the exposure time during the repeatedly ambient light sensing process, so as to find out the most appropriate exposure time, and then correct sensing results can be obtained. However, such an operation is not only time-consuming, but also causes power consumption.

In view of this, panel devices with a plurality of light sensors or a plurality of groups of light sensor configured therein are proposed such as the structures of panel devices as shown in FIG. 1 and FIG. 2, and each light sensor or each group of light sensor has a different sensitivity, which makes the time required for detecting the ambient brightness to be greatly shortened as compared with the existing design, and the detection accuracy of the ambient brightness is effectively improved as well.

Figure 5:
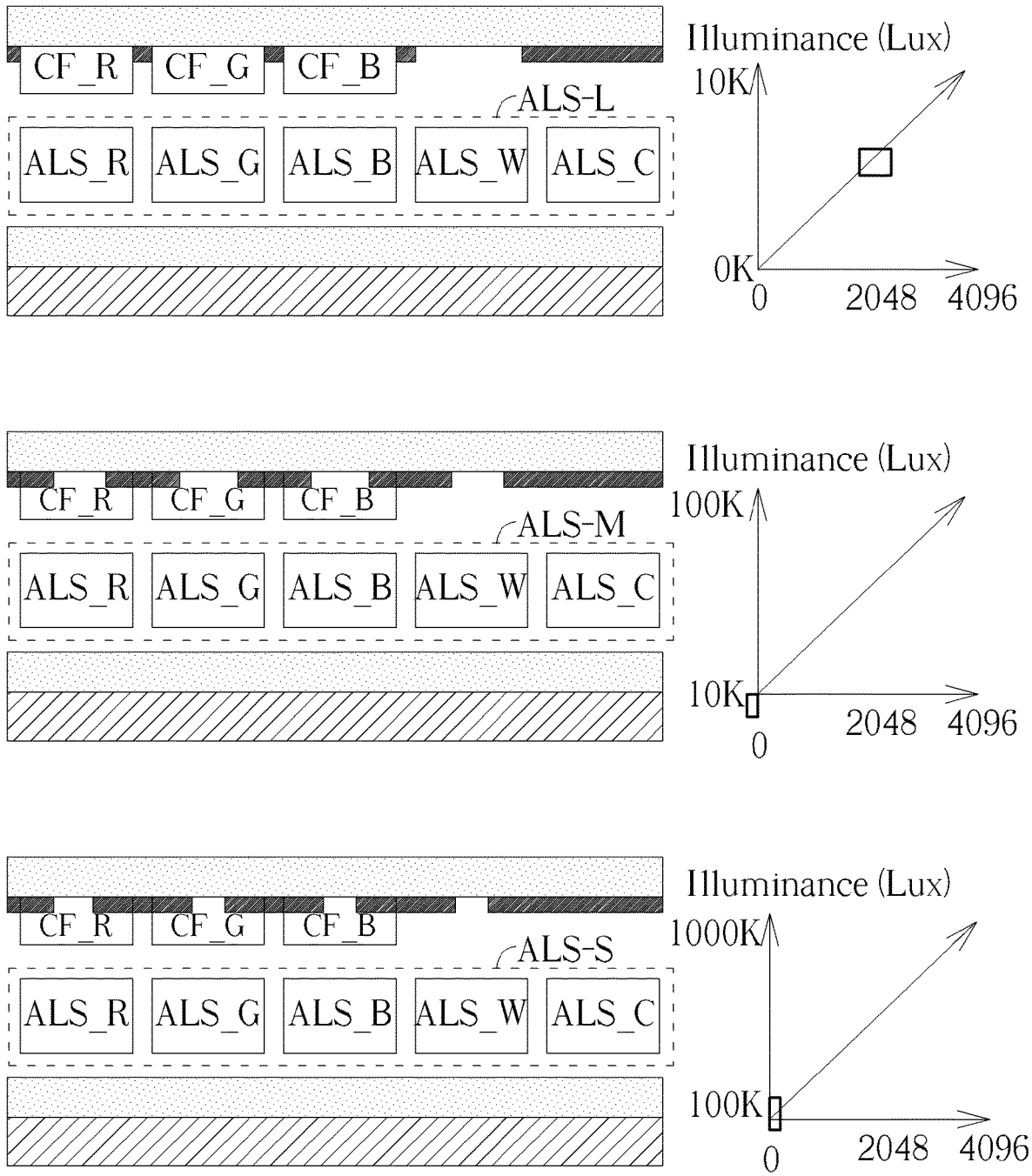
FIG. 5 is a schematic diagram showing the configuration of a plurality of light sensors and the sensing results obtained by performing light sensing operations according to an embodiment of the invention.

FIG. 5 is a schematic diagram showing the configuration of a plurality of light sensors and the sensing results obtained by performing light sensing operations according to an embodiment of the invention. According to an embodiment of the invention, the panel device may be equipped with a plurality of groups of light sensor, such as a first group of light sensor ALS-L, a second group of light sensor ALS-M, and a third group of light sensor ALS-S. The sizes of the sensors or the number of sensors of the plurality of groups light sensor may be respectively different. For example, the first group of light sensor ALS-L may be implemented by large-size or high-sensitivity photosensitive elements, the second group of light sensor ALS-M may be implemented by medium-sized or medium-sensitivity photosensitive elements, and the third group of light sensor ALS-S may be implemented by small-sized or low-sensitivity photosensitive elements. The photosensitive element may be a photodiode, and under the same ambient light intensity, the sensitivity of the photosensitive element may be expressed in the falling slope of the output voltage Vout obtained when performing the light sensing operation.

It is to be noted that the size of the light sensor or photosensitive element is not necessarily related to the sensitivity. In some embodiments of the invention, adjustment of the sensitivity of the light sensor may also be performed on fixed size photosensitive elements. In addition, in some embodiments of the invention, the same result of adjusting the sensitivity of the corresponding light sensor may also be obtained by adjusting the size of the dimer thereby changing the amount of incoming light. In other embodiments of the invention, the sensitivity adjustment may also be a combination of one or more of the above-mentioned methods.

As shown in FIG. 5, each group of light sensor may comprise a plurality of light sensors, for example, the light sensors ALS_R, ALS_G, ALS_B, ALS_W and ALS_C in one embodiment of the invention. A glass substrate and a backlight layer may be disposed below the light sensors, and a glass substrate and a shading material for light-blocking may be disposed above the light sensors. In addition, a color filter CF_R coated with red photoresistor is arranged above the light sensor ALS_R for the light sensor ALS_R to sense the brightness of red light, and a color filter CF_G coated with green photoresistor is arranged above the light sensor ALS_G for the light sensor ALS_G to sense the brightness of green light, a color filter CF_B coated with blue photoresistor is arranged above the light sensor ALS_B for the light sensor ALS_B to sense the brightness of blue light. There is no color filter arranged above the light sensor ALS_W, which may be regarded as being utilized to sense the brightness of white light (or natural light), while a shading material, also known as BM (black matrix), is disposed above the light sensor ALS_C for the sensing value thereof may be utilized to compensate for the sensing value of other light sensors.

According to an embodiment of the invention, the shading material disposed above the light sensors may form one or more dimers, and the sizes of the dimers disposed above different groups of light sensor may be different. For example, in an embodiment of the invention, the panel device may comprise a first shading material, a second shading material, and a third shading material (for example, the areas fully filled with slashes to seem like nearly black blocks in FIG. 5), the first shading material is disposed above the first group of light sensor ALS-L to form a plurality of first dimers (for example, the holes, which are the areas not filled with the shading material, above the light sensors ALS_R/ALS_G/ALS_B/ALS_W in the first group of light sensor ALS-L), the second shading material is disposed above the second group of light sensor ALS-M to form a plurality of second dimers (for example, the holes, which are the areas not filled with the shading material, above the light sensors ALS_R/ALS_G/ALS_B/ALS_W in the second group of light sensor ALS-M), the third shading material is disposed above the third group of light sensor ALS-S to form a plurality of third dimers (for example, the holes, which are the areas not filled with the shading material, above the light sensors ALS_R/ALS_G/ALS_B/ALS_W in the third group of light sensor ALS-S). A size of a first dimer may be greater than a size of a second dimer, and the size of the second dimer may be greater than a size of a third dimer, thereby controlling the amount of light entering the color filter and/or light sensor.

On the right side in FIG. 5 shows the sensing results obtained by each group of light sensor after performing the light sensing operation for a predetermined exposure time, where the horizontal axis represents the output voltage Vout of the light sensors or the sensing value (which is a digital value) corresponding to the difference between the aforementioned output voltages generated by the ADC and the vertical axis represents the illuminance corresponding to each sensing value. The lines in FIG. 5 show the relationship between the sensing values and the corresponding illuminance, and each box locates the points of the digital sensing value obtained by the ADC based on an analog sensing result (e.g., the aforementioned output voltage Vout or the difference between the output voltages) obtained by the corresponding light sensor (e.g., the light sensor shown on the left side in FIG. 5) when performing the light sensing operation.

According to an embodiment of the invention, the plurality of groups of light sensor may simultaneously perform light sensing operations within the same exposure time, thereby obtaining the sensing results as shown on the right side of FIG. 5. In the embodiments of the invention, since the light sensors with different sensitivities are installed in the panel device, the maximum and minimum ambient brightness that can be sensed or detected by the light sensors are different, or, the ranges of ambient brightness that can be sensed or detected by the light sensors are different. As the example shown in FIG. 5, the maximum sensible or detectable illuminance (Lux) of at least one light sensor in the first group of light sensor ALS-L is 10K Lux and the minimum sensible or detectable illuminance thereof is 0K; the maximum sensible or detectable illuminance of at least one light sensor in the second group of light sensor ALS-M is 100K Lux and the minimum sensible or detectable illuminance thereof is 10K; and the maximum sensible or detectable illuminance of at least one light sensor in the third group of light sensor ALS-S is 1000K Lux and the minimum sensible or detectable illuminance thereof is 100K. The sensing value corresponding to the aforementioned maximum sensible or detectable illuminance is the saturation upper limit of the output sensing value of corresponding light sensor, such as the value 4096 shown in FIG. 5, and the sensing value corresponding to the aforementioned minimum sensible or detectable illuminance is the saturation lower limit of the output sensing value of corresponding light sensor, such as the value 0 shown in FIG. 5.

The control circuit, such as the aforementioned control circuit 122/223, etc., may determine the sensing value obtained by which light sensor is between its saturation upper limit and its saturation lower limit, and determines the ambient brightness according to the sensing value that is between the saturation upper limit and the saturation lower limit. Among the sensing results shown in FIG. 5, the sensing result (i.e., the sensing value) corresponding to the light sensing signal generated by the first group of light sensor ALS-L is 2048, and the sensing values corresponding to the light sensing signals generated by the second group of light sensor ALS-M and the third group of light sensor ALS-S are both 0, which indicates that the current ambient light is relatively weak, so that the first group of light sensor ALS-L with higher sensitivity is able to accurately sense the brightness within the predetermined exposure time currently set, and the control circuit or the processor in the control circuit may determine the ambient brightness according to the obtained sensing value 2048. Similarly, when the current ambient light is relatively strong, the sensing results (i.e., the sensing values) corresponding to the light sensing signals generated by the first group of light sensor ALS-L and the second group of light sensor ALS-M may both be 4096, and the sensing value corresponding to the light sensing signal generated by the third group of light sensor ALS-S may be between the saturation upper limit and the saturation lower limit, so the control circuit or the processor in the control circuit may determine the ambient brightness according to the sensing value obtained by the third group of light sensor ALS-S.

Since in the embodiments of the invention, a plurality of groups of light sensor with different sensitivities are configured in the panel device, each group of light sensor is suitable for detecting light of a different range of intensities. In the embodiments of the invention, since the plurality of groups of light sensor are utilized to perform light sensing operations, simultaneously, within the same exposure time, an accurate sensing result can be obtained by simultaneously performing the light sensing operations for just one time, so there is no need to repeatedly perform ambient light sensing for multiple times to find out the most appropriate exposure time.

It is to be noted that although there are five light sensors utilized in the embodiment shown in FIG. 5 to form a group of light sensor, the invention is not limited thereto. In some embodiments of the invention, there may be only one light sensor to form a group of light sensor. For example, each group of light sensor may comprise only the light sensor ALS_W without a color filter, or, there may be other numbers of light sensors to form a group of light sensor. For example, each group of light sensor may comprise the light sensors ALS_R, ALS_G, and ALS_B with color filters, or comprise the light sensors ALS_W and ALS_C without color filters. In the embodiments of comprising the light sensors ALS_R, ALS_G and ALS_B with color filters, the control circuit may further adjust the displayed color temperature of the display panel according to the sensed brightness regarding the red, green and blue ambient light.

Referring back to FIG. 1 and FIG. 2, the panel devices 100 and 200 may be implemented as touch-controlled panel devices and may comprise a plurality of touch sensors (not shown in FIG. 1 and FIG. 2). The touch sensors may be disposed in the first area of the panel device 100/200 to sense the touch behavior of the display area and to generate a corresponding touch sensing signal, wherein the first area may comprise the display area 150/250. The touch sensor may be coupled to the control circuit 121/223 through the corresponding traces, so as to receive the driving and control signal required for the touch sensing operation (hereinafter collectively referred to as the touch sensing control signal) from the control circuit 121/223, and provide the generated touch sensing signals to the control circuit 121/223. The traces coupled to the touch sensors may be laid out in the first area, and the control circuit 121/223 may comprise a plurality of receiving pads electrically connected to the aforementioned traces that are coupled to the touch sensors, and the control circuit 121/223 may receive the touch sensing signals through these receiving pads. In addition, the panel device 100/200 may also comprise a plurality of display units (not shown in FIG. 1 and FIG. 2). The display units may be disposed in the first area of the panel device 100/200, and may be coupled to the control circuit 121/223 through a plurality of corresponding traces, so as to receive the driving and control signals required for display operation (hereinafter collectively referred to as display control signals) from the control circuit 121/223. The traces coupled to the display units may be laid out in the first area, and the control circuit 121/223 may comprise a plurality of display source pads, electrically connected to the aforementioned traces that are coupled to the display units, and the control circuit 121/223 may provide the display control signal to the corresponding display units through the display source pads.

In the embodiments of the invention, the receiving pads or the display source pads coupled to the control circuit 121/223 may be utilized to transmit the light sensing signals, as an example, the aforementioned traces that are coupled to the touch sensors or the display units may be utilized to also transmit the light sensing signals. With such design, the traces corresponding to the light sensors that are disposed in the non-display area (which may be understood as the second area) may be laid out in the display area (which may be understood as the first area) of the panel device 100/200, and the frame size is effectively reduced. For example, in an embodiment of the invention, the traces TS_1 and TS_1' may be coupled to a receiving pad or a display source pad of the control circuit 121/223, or in some embodiments, the traces TS_1 and TS_1' may be coupled to both a light sensor and a touch sensor or both a light sensor and a display unit at the same time. Similarly, the traces TS_2 and TS_2' may be coupled to a receiving pad or a display source pad of the control circuit 121/223, or in some embodiments, the traces TS_2 and TS_2' may be coupled to both a light sensor and a touch sensor or both a light sensor and a display unit at the same time, and the rest may be deduced by analogy.

Figure 6:
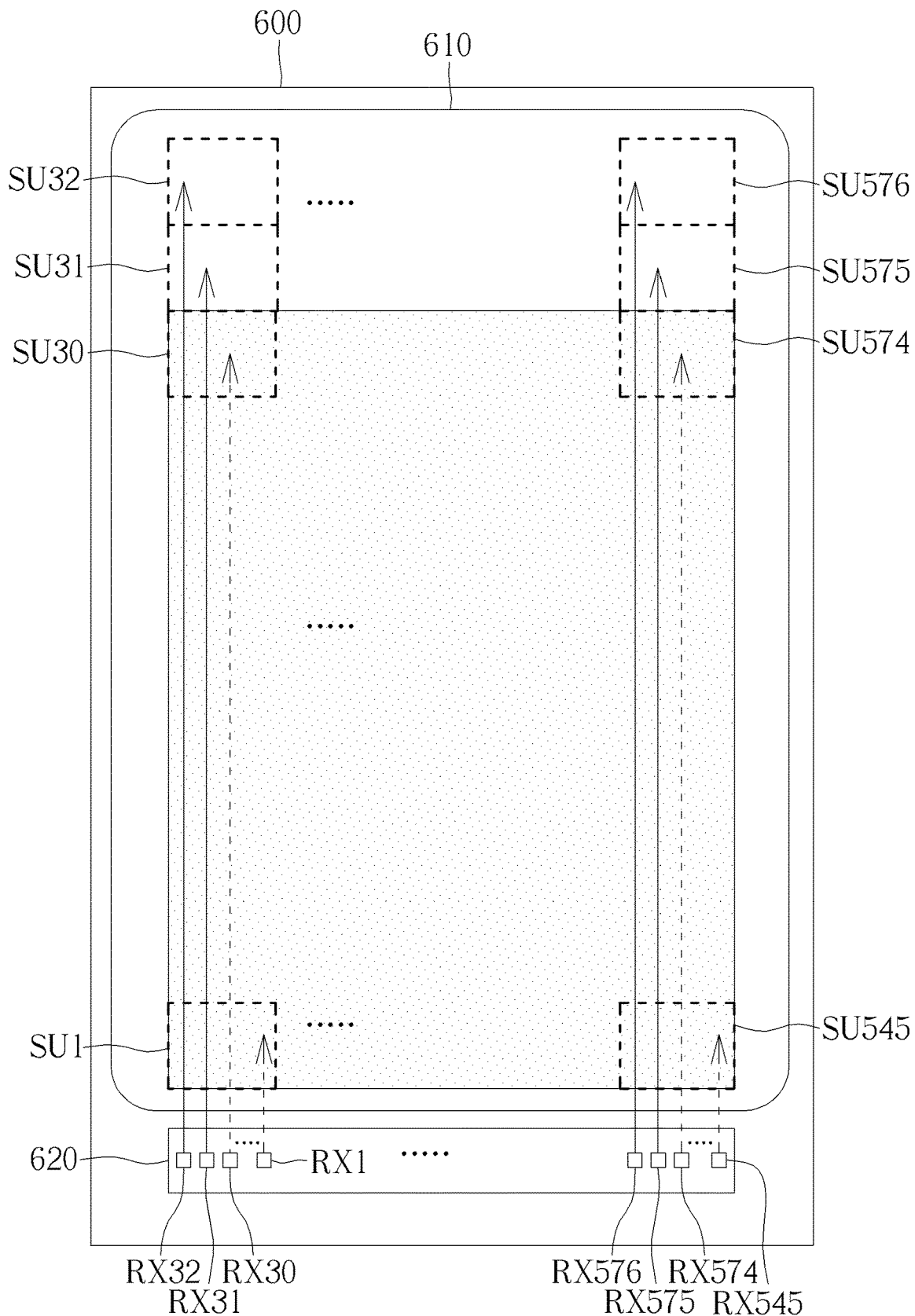
FIG. 6 is a schematic diagram of a panel device according to a first embodiment of the invention.

FIG. 6 is a schematic diagram of a panel device according to a first embodiment of the invention, for illustrating one configuration of the traces coupled to the light sensors. The panel device 600 may comprise a display panel 610 and a control circuit 620. The control circuit 620 may be a control circuit comprising the TDDI circuit/chip and the ALS driving circuit/chip, or an integrated chip integrating the TDDI circuit/chip and the ALS driving circuit/chip.

The control circuit 620 may comprise a plurality of receiving pads, such as the receiving pads RX1, . . . RX30, RX31, RX32, . . . RX545, . . . RX574, RX575, RX576 shown in FIG. 6. The display panel 610 may comprise a plurality of touch sensors and a plurality of light sensors, and each touch sensor may be electrically connected to a receiving pad through a corresponding trace. In addition, a touch sensor may correspond to a sensing unit SU on the display panel 610, for example, one of the sensing units SU1-SU576 shown in FIG. 6, to sense the touch behavior on the area covered by the sensing unit (e.g. the sensible area corresponding to the sensing unit) and may generate the corresponding touch sensing signal. The area covered by the sensing unit may comprise a plurality of pixels of the display panel 610. It is to be noted that the number of receiving pads and sensing units shown in FIG. 6 is merely an illustrative example, and the invention should not be limited thereto.

A portion of the sensing units of the display panel 610 may be disposed in the display area (or, touch controllable area), such as the sensing units SU1~SU30 . . . SU545~SU574, etc., while another portion of the sensing units may be disposed in the non-display area (or, non-touch controllable area), such as the sensing units SU31, SU32, SU575, SU576, etc.

According to the first embodiment of the invention, the receiving pads that are configured for the sensing units in the non-display area may be utilized to receive the light sensing signals, so that the traces corresponding to the light sensors may be laid out in the display area of the display panel instead of frame area. More specifically, in the first embodiment of the invention, the receiving pads RX31, RX32, RX63, RX64, RX575, RX576, etc. may be coupled to a light sensor through the corresponding traces (which are drawn in FIG. 6 by solid lines), while the other receiving pads may be coupled to a touch sensor through the corresponding traces (which are drawn in FIG. 6 by dotted lines), and the control circuit 620 may receive the light sensing signals from the corresponding light sensors through the receiving pads RX31, RX32, RX63, RX64, RX575 and RX576, and receive the touch sensing signals from the corresponding touch sensors through the remaining receiving pads. In this manner, the layout of the traces corresponding to the light sensors may be arranged in the display area of the display panel instead of in the frame area. It is to be noted that, in the embodiments of the invention, the sensing units disposed in the non-display area may be or may be not configured with a corresponding touch sensor, and the invention is not limited to any specific implementation.

Figure 7:
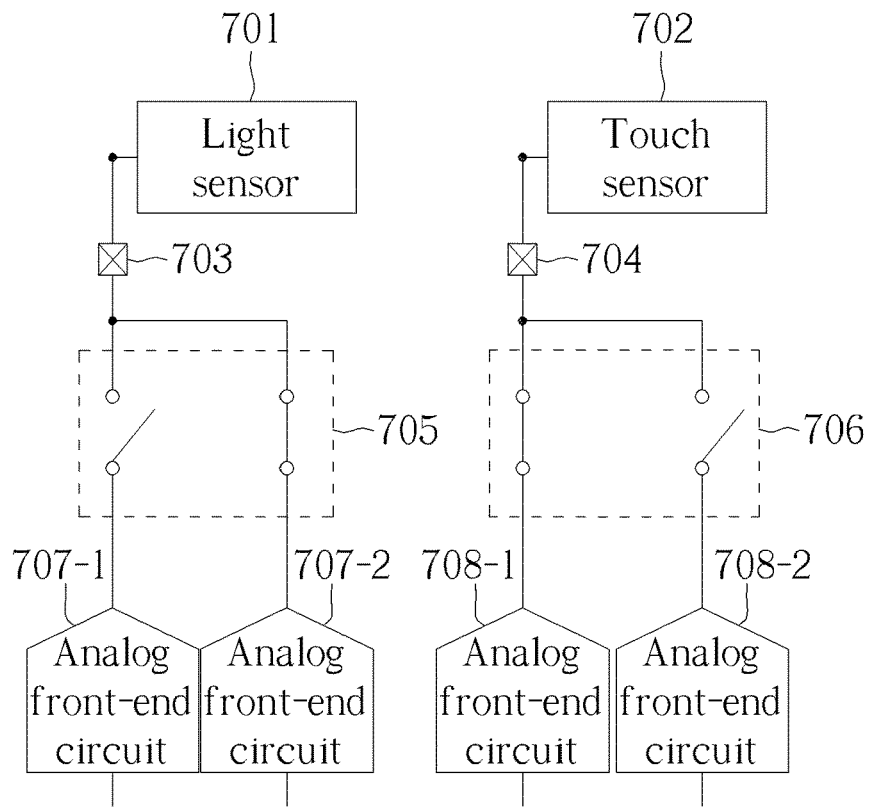
FIG. 7 shows an exemplary circuit diagram of the control circuit according to the first embodiment of the invention.

FIG. 7 shows an exemplary circuit diagram of the control circuit according to the first embodiment of the invention, for illustrating a portion of the control circuit. The light sensor 701 and the touch sensor 702 configured in the display panel are respectively connected to the control circuit through the corresponding traces and the receiving pads 703 and 704 of the control circuit. The control circuit may comprise switch circuits 705 and 706. The switch circuits 705 and 706 may respectively comprise two switch devices, and each switch device is coupled to an analog front-end circuit, where the analog front-end circuits 707-1 and 708-1 may be designed to process the touch sensing signals received from the touch sensor, for example, performing the operations such as amplifying, noise filtering, or analog-to-digital conversion on the touch sensing signals. The analog front-end circuits 707-2 and 708-2 may be designed to process the light sensing signals received from the light sensors, for example, performing the operations such as amplifying, noise filtering, or analog-to-digital conversion on the light sensing signals. One of the switch devices in the switch circuits 705 and 706 is closed to connect the sensor to the corresponding analog front-end circuit. For example, the switch device coupled to the analog front-end circuit 707-2 in the switch circuit 705 is closed, so as to connect the light sensor 701 to the analog front-end circuit 707-2 through the corresponding trace and the receiving pad 703, for the control circuit to receive the light sensing signal via the receiving pad 703. Similarly, the switch device coupled to the analog front-end circuit 708-1 in the switch circuit 706 is closed, so as to connect the touch sensor 702 to the analog front-end circuit 708-1 through the corresponding trace and the receiving pad 704, for the control circuit to receive the touch sensing signal via the receiving pad 704. With such a design of the control circuit, the result of transmitting the light sensing signal through the existing traces laid out on the display panel can be achieved.

Taking the embodiment in FIG. 6 as an illustrative example, assuming that a maximum number of 32 touch sensors can be configured in one column, and in the embodiment of the invention, only 30 (or 31) touch sensors are disposed in one column in the display area, and the size of the touch sensors may be selected to be larger than the case when 32 touch sensors are disposed in one column, so the size of each touch sensor may be larger than that in the 32 touch sensors case. In this manner, the traces corresponding to the omitted (that is, un-configured) touch sensor (for example, 1-2 touch sensors reduced in each column) may be utilized to be connected to the light sensors, for transmitting the light sensing signal to the control circuit through the display area of the display panel.

It is to be noted that the embodiments of the invention are not limited to configure an analog front-end circuit for one light sensor/touch sensor. That is, the analog front-end circuit shown in FIG. 7 may also be coupled to a plurality of light sensors/touch sensors and shared by these light sensors/touch sensors.

Figure 8:
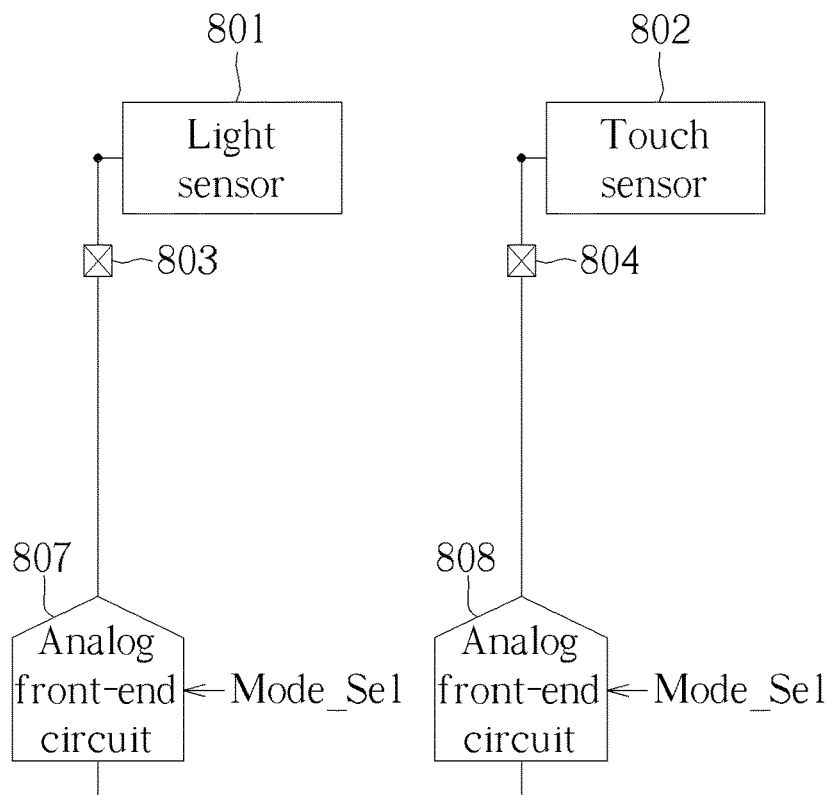
FIG. 8 shows another exemplary circuit diagram of the control circuit according to the first embodiment of the invention.

FIG. 8 shows another exemplary circuit diagram of the control circuit according to the first embodiment of the invention, for illustrating a portion of the control circuit. In this embodiment, the light sensor and the touch sensor may share an analog front-end circuit. The light sensor 801 and the touch sensor 802 configured in the display panel may be respectively connected to the analog front-end circuits 807 and 808 in the control circuit through the corresponding traces and the receiving pads 803 and 804 of the control circuit, so that the control circuit may respectively receive light sensing signals and touch sensing signals through the receiving pads 803 and 804. The analog front-end circuits 807 and 808 may be designed to have the capability of processing touch sensing signals received from the touch sensor and processing light sensing signals received from the light sensor. The analog front-end circuits 807 and 808 may receive a mode selection signal Mode_Sel, and perform corresponding signal processing in response to the setting value of the mode selection signal Mode_Sel. For example, the mode selection signal Mode_Sel may be set between at least two setting values. In response to the first setting value, the analog front-end circuits 807 and 808 may perform signal processing corresponding to the touch sensing signal. In response to the second setting value, the analog front-end circuits 807 and 808 may perform signal processing corresponding to the light sensing signal. The processor in the control circuit may respectively set the mode selection signal Mode_Sel to be provided to the analog front-end circuits 807 and 808 according to the required signal processing. With such a design of the control circuit, the result of transmitting the light sensing signal through the existing traces laid out on the display panel can be achieved.

Figure 9:
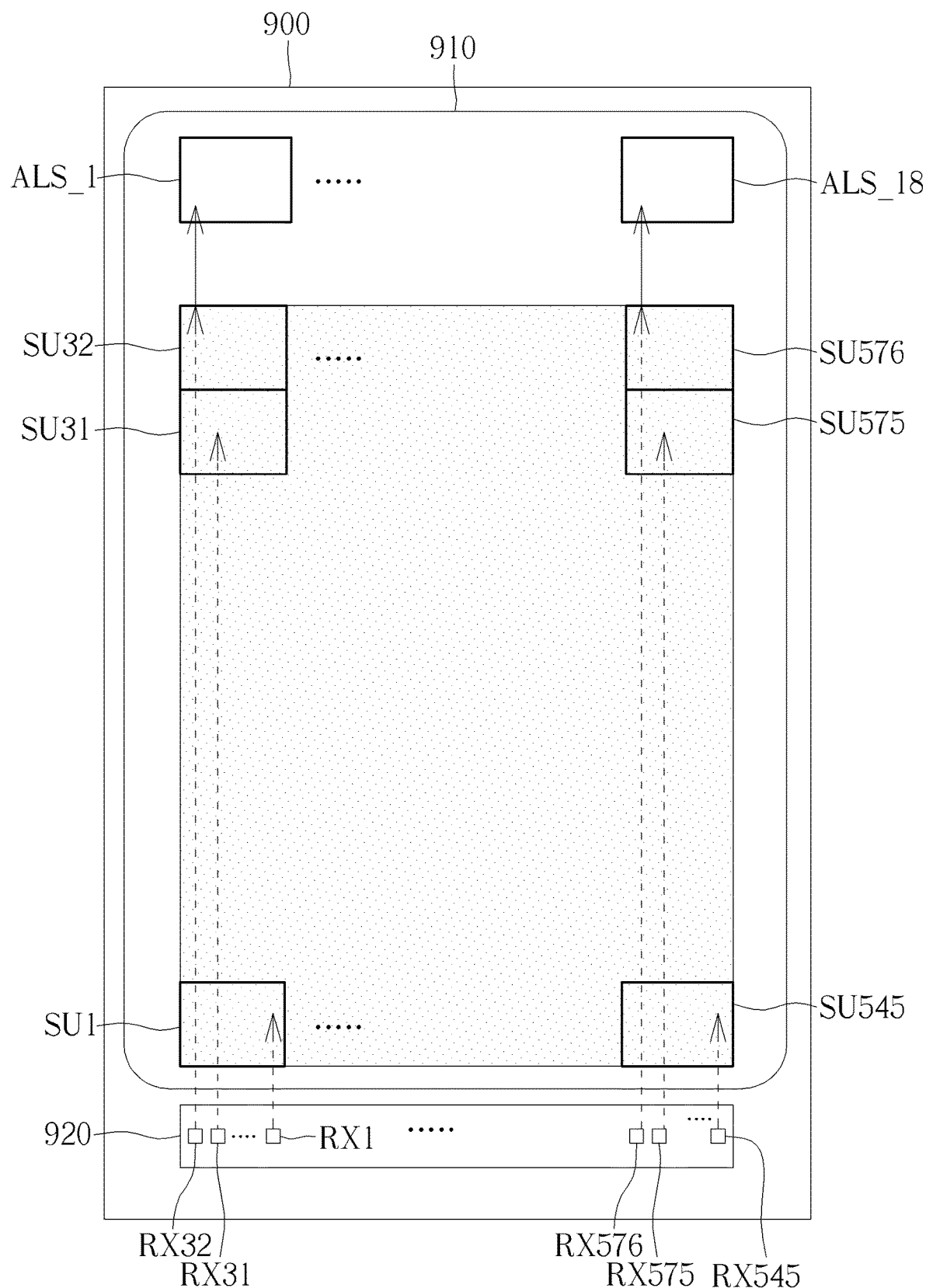
FIG. 9 is a schematic diagram of a panel device according to a second embodiment of the invention.

FIG. 9 is a schematic diagram of a panel device according to a second embodiment of the invention, for illustrating another configuration of the traces coupled to the light sensors. The panel device 900 may comprise a display panel 910 and a control circuit 920. The control circuit 920 may be a control circuit comprising the TDDI circuit/chip and the ALS driving circuit/chip, or an integrated chip integrating the TDDI circuit/chip and the ALS driving circuit/chip.

The control circuit 920 may comprise a plurality of receiving pads, such as the receiving pads RX1, . . . RX31, RX32, . . . RX545, . . . , RX575, RX576 shown in FIG. 9. The display panel 910 may comprise a plurality of touch sensors and a plurality of light sensors, and each touch sensor may be electrically connected to a receiving pad through a corresponding trace. In addition, a touch sensor may correspond to a sensing unit SU on the display panel 910, for example, one of the sensing units SU1-SU576 shown in FIG. 9, to sense the touch behavior on the area covered by the sensing unit (e.g. the sensible area corresponding to the sensing unit) and may generate the corresponding touch sensing signal. The area covered by the sensing unit may comprise a plurality of pixels of the display panel 910. It is to be noted that the number of receiving pads and sensing units shown in FIG. 9 is merely an illustrative example, and the invention should not be limited thereto.

According to the second embodiment of the invention, the receiving pads that are configured for the sensing units in the display area may be utilized to receive the light sensing signals, so that the traces corresponding to the light sensors may also be laid out in the display area of the display panel instead of frame area as in the first embodiment of the invention. More specifically, in the second embodiment of the invention, the receiving pads RX32, RX64, . . . , RX576, etc. are not only coupled to a respective touch sensor through the corresponding trace (which are drawn in FIG. 9 by dotted lines), but are also respectively coupled to a light sensor, such as one of the light sensors ALS_1~ALS_18 shown in FIG. 9, through the extended portion (which are drawn in FIG. 9 by solid lines) of the corresponding trace that is further extended to the non-display area of the display panel 910 in this embodiment.

The control circuit 920 may receive the touch sensing signals from the corresponding touch sensors through the receiving pads RX1~RX576, and may further receive light sensing signals from the corresponding light sensors through the receiving pads RX32, RX64, . . . , RX576, etc. to control a brightness or a color temperature of the display area of the screen or the display panel, so that the traces corresponding to the light sensors are laid out in the display area of the display panel instead of in the frame area.

Figure 10:
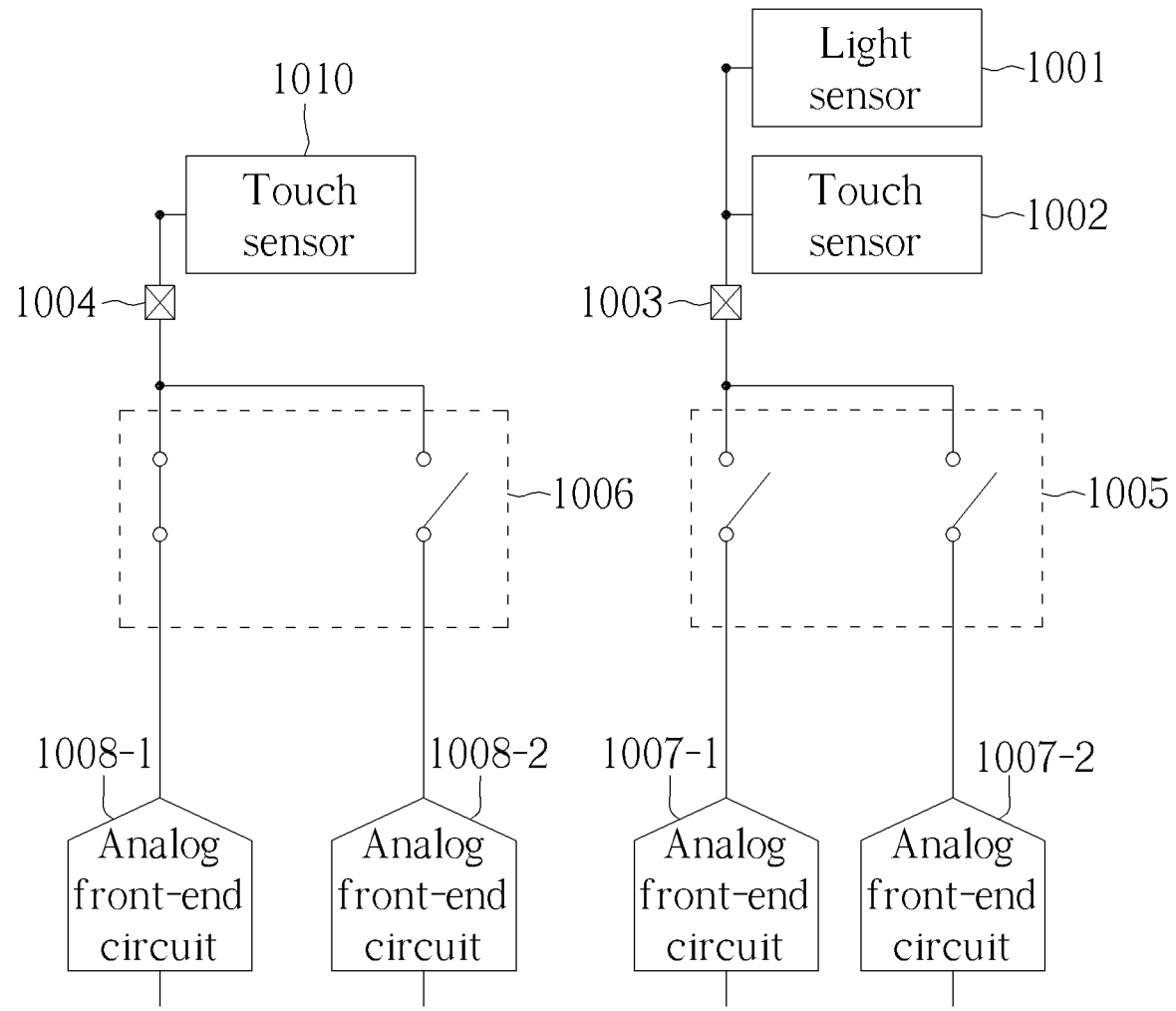
FIG. 10 shows an exemplary circuit diagram of the control circuit according to the second embodiment of the invention.

FIG. 10 shows an exemplary circuit diagram of the control circuit according to the second embodiment of the invention, for illustrating a portion of the control circuit. In the second embodiment of the invention, the light sensor 1001 and the touch sensor 1002 configured in the display panel are connected to the same receiving pad 1003 of the control circuit through the corresponding trace, that is, the light sensor 1001 and the touch sensor 1002 share the same trace and the receiving pad 1003, and another touch sensor 1010 configured in the display panel is connected to the receiving pad 1004 of the control circuit through the corresponding trace. According to an embodiment of the invention, the trace connected to the light sensor 1001 and the touch sensor 1002 is laid out along a first direction and through the display area of the display panel, and finally extends to the light sensor 1001. Another trace, e.g., another trace connected to another light sensor as shown in FIG. 9, is also laid out along the first direction and through the display area of the display panel, and finally extends to said another light sensor. According to an embodiment of the invention, as shown in FIG. 9, the light sensors may be disposed along a second direction substantially perpendicular to the first direction, where the first direction may be a vertical direction of the display area of the display panel.

The control circuit may comprise switch circuits 1005 and 1006. The switch circuits 1005 and 1006 may respectively comprise two switch devices, and each switch device is coupled to an analog front-end circuit, wherein the analog front-end circuits 1007-1 and 1008-1 may be designed to process the touch sensing signals received from the touch sensor, for example, performing the operations such as amplifying, noise filtering, or analog-to-digital conversion on the touch sensing signals, and the analog front-end circuits 1007-2 and 1008-2 may be designed to process the light sensing signal received from the light sensor, for example, performing the operations such as amplifying, noise filtering, or analog-to-digital conversion on the light sensing signal. One of the switch devices in the switch circuits 1005 and 1006 is closed to connect the sensor to the corresponding analog front-end circuit. For example, the switch device coupled to the analog front-end circuit 1008-1 in the switch circuit 1006 is closed, so as to connect the touch sensor 1010 to the analog front-end circuit 1008-1 through the corresponding trace and the receiving pad 1004, for the control circuit to receive the touch sensing signal through the receiving pad 1004. As to the light sensor 1001 and the touch sensor 1002 sharing the trace and the receiving pad 1003, the processor in the control circuit may dynamically control the switch devices in the switch circuit 1005 according to the current operation.

When performing the touch sensing operation, the switch device coupled to the analog front-end circuit 1007-1 in the switch circuit 1005 is closed, so as to connect the touch sensor 1002 to the analog front-end circuit 1007-1 through the corresponding trace and the receiving pad 1003, for the control circuit to receive the touch sensing signal through the receiving pad 1003; and when performing the light sensing operation, the switch device coupled to the analog front-end circuit 1007-2 in the switch circuit 1005 is closed to connect the light sensor 1001 to the analog front-end circuit 1007-2 through the corresponding trace and the receiving pad 1003, for the control circuit to receive the light sensing signal through the receiving pad 1003.

Figure 11:
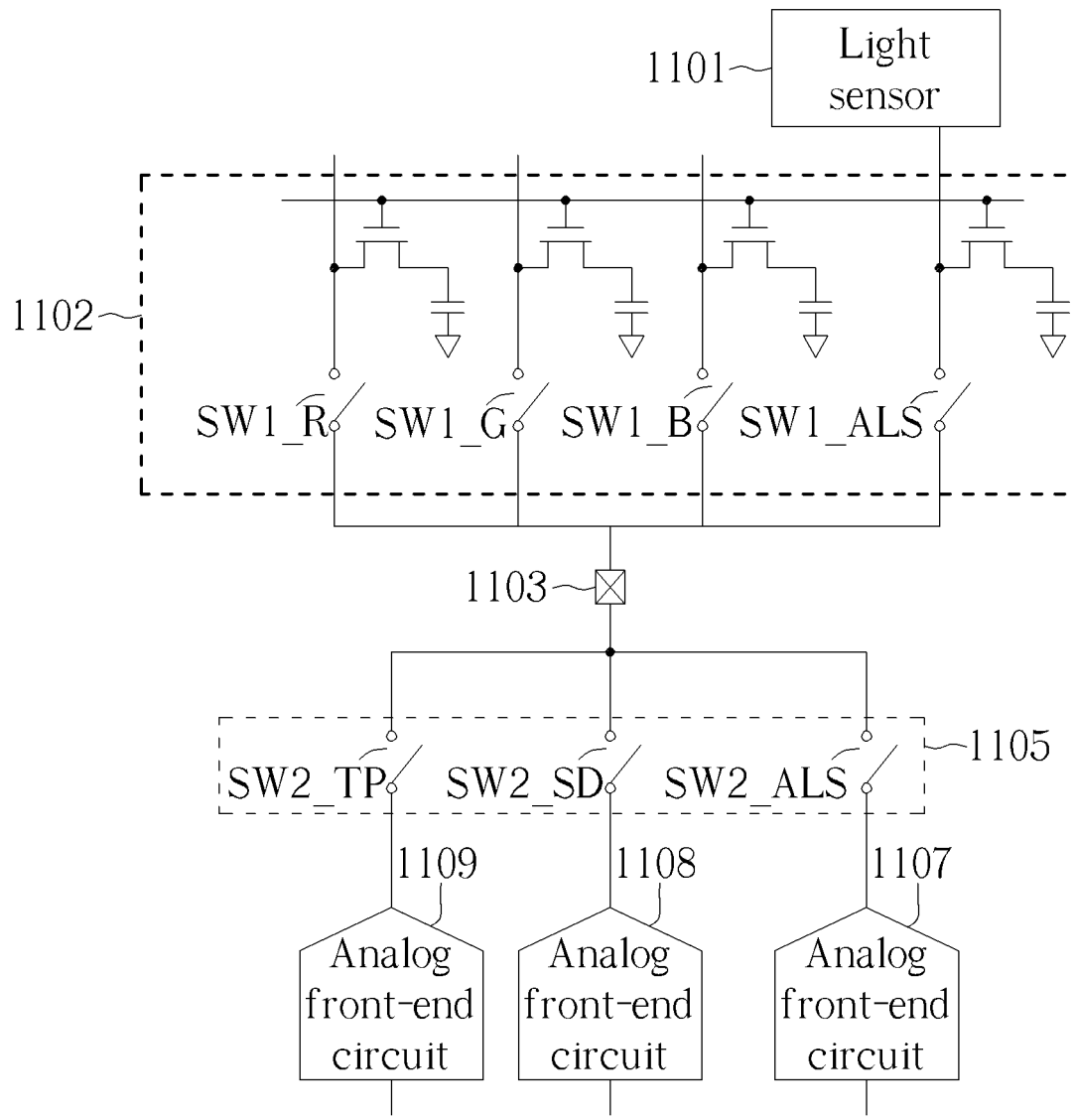
FIG. 11 shows an exemplary circuit diagram of the control circuit according to a third embodiment of the invention, for illustrating a portion of the control circuit.

FIG. 11 shows an exemplary circuit diagram of the control circuit according to a third embodiment of the invention, for illustrating a portion of the control circuit. In the third embodiment of the invention, the display unit 1102 configured on the display panel is connected to a display source pad 1103 of the control circuit through a corresponding trace. In addition, the light sensor 1101 is also connected to the same display source pad 1103 of the control circuit through the corresponding trace, that is, the light sensor 1101 and the display unit 1102 share the display source pad 1103, and the control circuit provides the display control signal to the display unit 1102 through the display source pad 1103, and receives the light sensing signals from the light sensor 1101 through the display source pad 1103.

The control circuit may comprise a switch circuit 1105. The switch circuit 1105 may comprise switch devices SW2_TP, SW2_SD and SW2_ALS, each switch device is coupled to an analog front-end circuit. The analog front-end circuit 1107 may be designed to process the light sensing signal received from the light sensor 1101, for example, performing the operations such as amplifying, noise filtering, or analog-to-digital conversion on the light sensing signal. The analog front-end circuit 1108 may be designed to process the display control signals, for example, performs digital-to-analog conversion operation on the display control signals. The analog front-end circuit 1109 may be designed to process the touch sensing control signal. When the control circuit performs display driving operation, the switch device SW2_SD is closed to provide display control signals to the display unit 1102 through the display source pad 1103 and the corresponding trace. When the control circuit performs the light sensing operation, the switch device SW2_ALS is closed to receive the light sensing signal from the light sensor 1101 through the display source pad 1103 and the corresponding trace. When the control circuit performs the touch sensing operation, the switch device SW2_TP is closed to provide the touch sensing control signal.

The display unit 1102 may comprise a plurality of pixel circuits and a plurality of switch devices, for example, switch devices SW1_R, SW1_G, SW1_B and SW1_ALS. When performing display driving operation, the control circuit may sequentially close the switch devices SW1_R, SW1_G and SW1_B to provide the display control signals to the corresponding pixel circuits (for example, to provide corresponding voltages to the red, green and blue pixel circuits). When performing the light sensing operation, the control circuit may close the switch device SW_ALS to receive the light sensing signal from the light sensor 1101.

According to an embodiment of the invention, the control circuit may receive the touch sensing signal in a first time period, and the plurality of light sensors may generate corresponding light sensing signals in a second time period, wherein the first time period does not overlap with the second time period. In addition, the control circuit may output the display control signal in a third time period, and the third time period does not overlap with the second time period.

Figure 12:
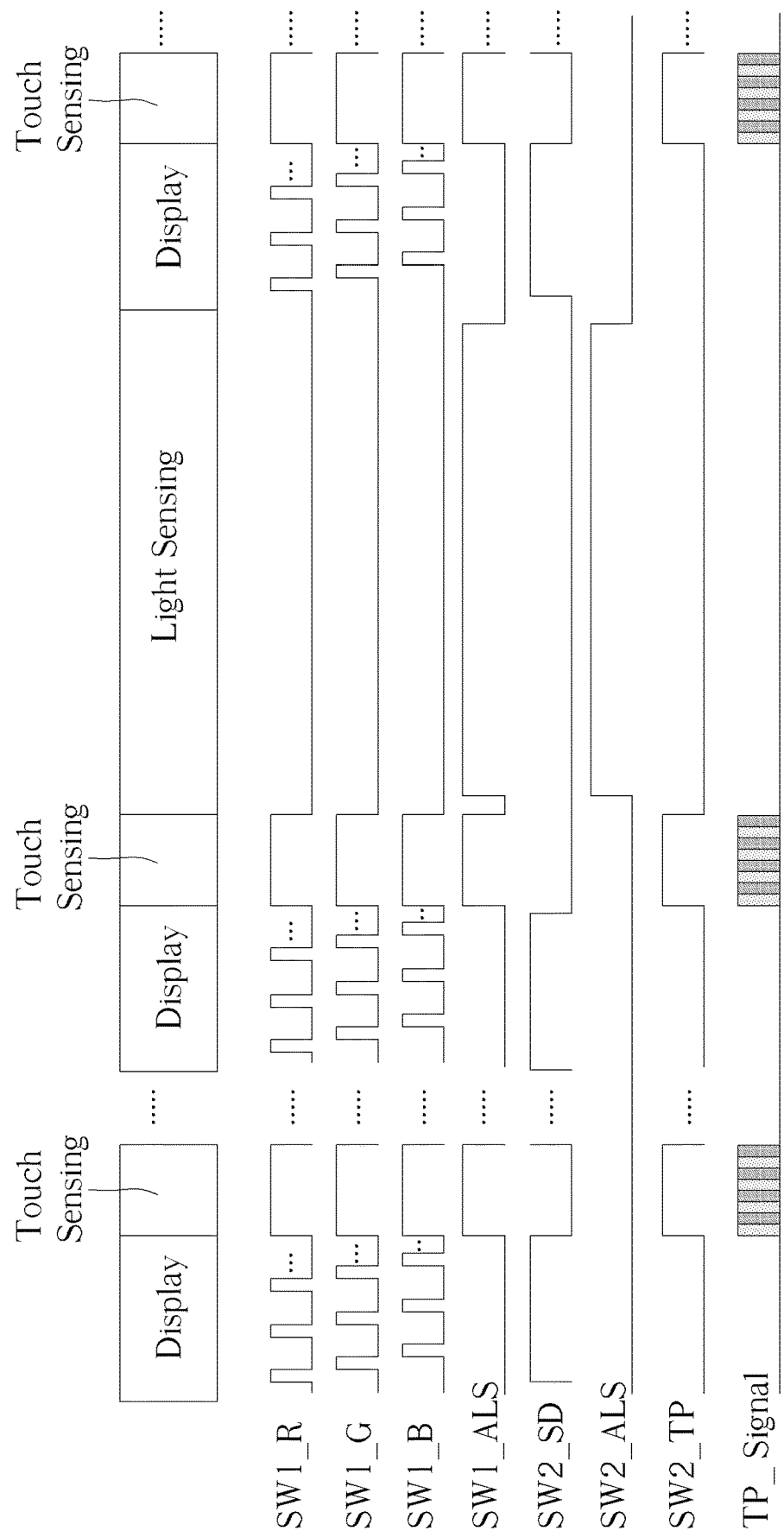
FIG. 12 is a timing diagram showing the performance of display driving operation, touch sensing operation and light sensing operation according to the third embodiment of the invention.

FIG. 12 is a timing diagram showing the performance of display driving operation, touch sensing operation and light sensing operation according to the third embodiment of the invention. FIG. 12 sequentially depicts waveforms of the control signals provided to the switch devices SW1_R, SW1_G, SW1_B, SW1_ALS, SW2_SD, SW2_ALS and SW2_TP for controlling the open/close status thereof, and the waveform of the received touch sensing signal. During the display time period, the control circuit closes the switch device SW2_SD, and sequentially closes the switch devices SW1_R, SW1_G and SW1_B (e.g., by pulling the voltage of the corresponding control signals to the high level) to provide corresponding voltages to the red, green and blue pixel circuits. During the touch sensing time period, the control circuit closes the switch device SW2_TP to perform the corresponding touch sensing operation and receive the touch sensing signal TP_Signal. During the light sensing time period, the control circuit closes the switch devices SW2_ALS and SW1_ALS to perform the light sensing operations and receive the corresponding light sensing signals.

It is to be noted that, in other embodiments of the invention, such as the aforementioned first embodiment, the time period for performing touch sensing and the time period for performing light sensing may overlap with each other. For example, the control circuit may perform light sensing while performing touch sensing at the same time. Therefore, the invention is not limited to the timing shown in FIG. 12.

FIG. 13 is a schematic diagram of a panel device according to an embodiment of the invention, for illustrating a stacked structure of the panel device. The main diagram of FIG. 13 is a top view of the display panel 1310 and the control circuit 1320, and the side views of cross section A and cross section B are shown below the main diagram. The display area of the display panel 1310 may comprise a plurality of pixel electrodes, such as pixel electrodes 136 and 137, and the common electrode 133 is disposed below the pixel electrodes. In addition, in the embodiment of the invention, the display area of the display panel 1310 may also comprise a plurality of traces for transmitting touch sensing signals and light sensing signals, such as the trace 134, and a plurality of display source lines for transmitting display control signals, such as the display source line 135. In this embodiment, the traces to transmit the touch sensing signal and the light sensing signal, such as the trace 134, and the plurality of display source lines to transmit the display control signals, such as the display source line 135, are disposed in the same layer.

FIG. 14 is a schematic diagram of a panel device according to another embodiment of the invention, for illustrating another stacked structure of the panel device. The main diagram of FIG. 14 is a top view of the display panel 1410 and the control circuit 1420, and the side views of cross section A' and cross section B' are shown below the main diagram. The display area of the display panel 1410 may comprise a plurality of pixel electrodes, such as pixel electrodes 146 and 147, and the common electrode 143 is disposed below the pixel electrodes. In addition, in the embodiment of the invention, the display area of the display panel 1410 may also comprise a plurality of traces for transmitting touch sensing signals and light sensing signals, such as the trace 144, and a plurality of display source lines for transmitting display control signals, such as the display source line 145. In this embodiment, the traces to transmit the touch sensing signal and the light sensing signal, such as the trace 144, and the plurality of display source lines to transmit the display control signals, such as the display source line 135, are disposed in different layers.

In the embodiments of the invention, the touch sensor and the light sensor configured in the panel device may be manufactured by the same process. In some embodiments of the invention, the light sensor may have a touch sensing function, or the touch sensor may have a light sensing function. In addition, in the embodiments of the invention, the light sensor may also be manufactured together with the process of the display panel, that is, the light sensor is implemented as a part of the display panel, rather than as an additional component after the manufacture of display panel is completed.

In the various designs of a panel device proposed by the invention, the panel device is equipped with a plurality of light sensors having different sensitivities, and the traces originally configured in the panel, such as the traces for transmitting the touch sensing signals or the display control signals, are utilized to receive the light sensing signal, which effectively saves the area of the side frame and the bottom frame of the panel device, and there is also no need to increase the number of receiving pads of the control circuit. In particular, since each light sensor requires a trace to transmit the light sensing signal, the more the number of light sensors, the more traces required. If the traces are disposed in the frame area of the panel device, the size of the frame area will be greatly increased. With the proposed various designs of a panel device, the area of the side frame and the bottom frame of the panel device are saved, and even the results of high-accuracy and fast detection of ambient brightness can be achieved without increasing the size of the frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A panel device, comprising:
   a touch sensor, disposed in a first area of the panel device and to generate a touch sensing signal;
   a first light sensor and a second light sensor, disposed in a second area of the panel device, to respectively sense ambient light and accordingly generate a first light sensing signal and a second light sensing signal;
   a first trace, coupled to the first light sensor;
   a second trace, coupled to the second light sensor; and
   a control circuit, connected to the first trace and the second trace to receive the first light sensing signal and the second light sensing signal at the same time and determine an ambient brightness,
   wherein a sensitivity of the first light sensor and a sensitivity of the second light sensor are different.

2. The panel device of claim 1, wherein the control circuit receives the touch sensing signal in a first time period, the first light sensor and the second light sensor generate the first sensing signal and the second light sensing signal in a second time period, and the first time period does not overlap with the second time period.

3. The panel device of claim 1, wherein the first area comprises a display area of the panel device, the second area is a non-display area of the panel device, and wherein the first trace and the second trace extend from the control circuit along a vertical direction of the display area and respectively to the first light sensor and the second light sensor.

4. The panel device of claim 3, wherein the first trace is further coupled to the tough sensor.

5. The panel device of claim 1, further comprising:
   a first shading material, disposed above the first light sensor to form a first dimer; and
   a second shading material, disposed above the second light sensor to form a second dimer, wherein a size of the first dimer is greater than a size of the second dimer.

6. The panel device of claim 1, wherein a size of a photosensitive element comprised in the first light sensor is greater than a size of a photosensitive element comprised in the second light sensor.

7. The panel device of claim 6, wherein when determining the ambient brightness, the control circuit further determines which of a sensing value corresponding to the first light sensing signal and a sensing value corresponding to the second light sensing signal is between a saturation upper limit and a saturation lower limit, and determines the ambient brightness according to the sensing value that is between the saturation upper limit and the saturation lower limit.

8. The panel device of claim 1, wherein the control circuit is an integrated chip comprising a first receiving pad, a second receiving pad and a third receiving pad, the control circuit receives the first light sensing signal through the first receiving pad, receives the second light sensing signal through the second receiving pad and receives the touch sensing signal through the third receiving pad.

9. The panel device of claim 1, wherein the control circuit is an integrated chip comprising a first receiving pad and a second receiving pad, the control circuit receives the first light sensing signal and the touch sensing signal through the first receiving pad, and receives the second light sensing signal through the second receiving pad.

10. The panel device of claim 1, further comprising a display unit, disposed in the first area, and the control circuit is an integrated chip comprising:
    a display source pad, to provide a display control signal to the display unit, wherein the display source pad is further coupled to the first light sensor;
    a first switch device, coupled to the display source pad;
    a second switch device, coupled to the display source pad;
    a first processing circuit, coupled to the first switch device and to output the display control signal; and
    a second processing circuit, coupled to the second switch device and to process the first light sensing signal,
    wherein when the control circuit performs display driving, the first switch device is closed and when the control circuit performs an operation of ambient light sensing, the second switch device is closed.

11. A panel device, comprising:
    a first light sensor and a second light sensor, to respectively sense ambient light and accordingly generate a first light sensing signal and a second light sensing signal;
    a first trace, coupled to the first light sensor;
    a second trace, coupled to the second light sensor; and
    a control circuit, connected to the first trace and the second trace to receive the first light sensing signal and the second light sensing signal at the same time and determine an ambient brightness,
    wherein the panel device have a display area and a non-display area, the first light sensor and the second light sensor are disposed in the non-display area of the panel device, and the first trace and the second trace extend from the control circuit along a vertical direction of the display area and through the display area, and respectively extend to the first light sensor and the second light sensor.

12. The panel device of claim 11, wherein a sensitivity of the first light sensor and a sensitivity of the second light sensor are different.

13. The panel device of claim 11, further comprising:
    a touch sensor, disposed in the display area of the panel device to generate a touch sensing signal.

14. The panel device of claim 13, wherein the control circuit receives the touch sensing signal in a first time period, the first light sensor and the second light sensor generate the first sensing signal and the second light sensing signal in a second time period, and the first time period does not overlap with the second time period.

15. The panel device of claim 13, wherein the first trace is further coupled to the tough sensor.

16. The panel device of claim 11, further comprising:
    a first shading material, disposed above the first light sensor to form a first dimer; and a second shading material, disposed above the second light sensor to form a second dimer, wherein a size of the first dimer is greater than a size of the second dimer.

17. The panel device of claim 11, wherein a size of a photosensitive element comprised in the first light sensor is greater than a size of a photosensitive element comprised in the second light sensor.

18. The panel device of claim 17, wherein when determining the ambient brightness, the control circuit further determines which of a sensing value corresponding to the first light sensing signal and a sensing value corresponding to the second light sensing signal is between a saturation upper limit and a saturation lower limit, and determines the ambient brightness according to the sensing value that is between the saturation upper limit and the saturation lower limit.

19. The panel device of claim 13, wherein the control circuit is an integrated chip comprising a first receiving pad, a second receiving pad and a third receiving pad, the control circuit receives the first light sensing signal through the first receiving pad, receives the second light sensing signal through the second receiving pad and receives the touch sensing signal through the third receiving pad.

20. The panel device of claim 13, wherein the control circuit is an integrated chip comprising a first receiving pad and a second receiving pad, the control circuit receives the first light sensing signal and the touch sensing signal through the first receiving pad, and receives the second light sensing signal through the second receiving pad.

21. A panel device, comprising:
a display area;
a non-display area;
a first light sensor and a second light sensor, disposed in the non-display area and to respectively sense ambient light and accordingly generate a first light sensing signal and a second light sensing signal;
a first trace, laid out along a first direction and through the display area, and to extend to the first light sensor;
a second trace, laid out along the first direction and through the display area, and to extend to the second light sensor; and
a control circuit, connected to the first trace and the second trace to receive the first light sensing signal and the second light sensing signal at the same time and control a brightness or a color temperature of the display area.

22. The panel device of claim 21, further comprising:
a touch sensor, disposed in the display area of the panel device and to generate a touch sensing signal.

23. The panel device of claim 22, wherein the first trace is further coupled to the tough sensor.

24. The panel device of claim 22, wherein the control circuit comprises a first receiving pad and a second receiving pad, the control circuit receives the first light sensing signal and the touch sensing signal through the first receiving pad, and receives the second light sensing signal through the second receiving pad.

25. The panel device of claim 24, wherein the first light sensor and the touch sensor share the first trace and the first receiving pad and are coupled to the control circuit through the first trace and the first receiving pad.

26. The panel device of claim 24, wherein the control circuit further comprises:
a first switch device, coupled to the first receiving pad;
a second switch device, coupled to the first receiving pad;
a first processing circuit, coupled to the first switch device and to process the first light sensing signal; and
a second processing circuit, coupled to the second switch device and to process the touch sensing signal,
wherein when the control circuit performs an operation of ambient light sensing, the first switch device is closed and when the control circuit performs an operation of touch sensing, the second switch device is closed.

27. The panel device of claim 22, wherein the control circuit receives the touch sensing signal in a first time period, the first light sensor and the second light sensor generate the first sensing signal and the second light sensing signal in a second time period, and the first time period does not overlap with the second time period.

28. The panel device of claim 21, wherein a sensitivity of the first light sensor and a sensitivity of the second light sensor are different.

29. The panel device of claim 22, wherein the first light sensor and the touch sensor are disposed along the first direction, and the first light sensor and the second light sensor are disposed along a second direction substantially perpendicular to the first direction.

30. The panel device of claim 29, wherein the first direction is a vertical direction of the display area.

* * * * *